(12) United States Patent
Tokumoto

(10) Patent No.: US 8,711,412 B2
(45) Date of Patent: Apr. 29, 2014

(54) INFORMATION PROCESSING APPARATUS, INCLUDING UPDATING OF PROGRAM AND PROGRAM INFORMATION, AND METHOD OF UPDATING PROGRAM OF THE INFORMATION PROCESSING APPARATUS

(75) Inventor: Yoko Tokumoto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 171 days.

(21) Appl. No.: 13/382,829

(22) PCT Filed: Sep. 20, 2011

(86) PCT No.: PCT/JP2011/071941
§ 371 (c)(1),
(2), (4) Date: Jan. 6, 2012

(87) PCT Pub. No.: WO2012/039505
PCT Pub. Date: Mar. 29, 2012

(65) Prior Publication Data
US 2012/0200891 A1 Aug. 9, 2012

(30) Foreign Application Priority Data
Sep. 22, 2010 (JP) .................................. 2010-212379

(51) Int. Cl.
*G06F 15/00* (2006.01)
*G06F 3/12* (2006.01)
*G06K 1/00* (2006.01)
*G06K 15/00* (2006.01)
*G06K 15/02* (2006.01)

(52) U.S. Cl.
CPC ............ *G06F 3/1297* (2013.01); *G06F 3/1298* (2013.01); *G06K 15/00* (2013.01); *G06K 15/02* (2013.01)
USPC ......................................... 358/1.15; 358/1.13

(58) Field of Classification Search
CPC ..... G06F 3/1297; G06F 3/1298; G06K 15/00; G06K 15/02
See application file for complete search history.

(56) References Cited

U.S. PATENT DOCUMENTS 7,227,656 B1 * 6/2007 Kato ............................ 358/1.15
2009/0063842 A1 * 3/2009 Azami ............................. 713/2

FOREIGN PATENT DOCUMENTS

| JP | 2006099393 A | 4/2006 |
|---|---|---|
| JP | 2006344098 A | 12/2006 |
| JP | 2007199947 A | 8/2007 |
| JP | 2008171289 A | 7/2008 |

* cited by examiner

*Primary Examiner* — Douglas Tran
(74) *Attorney, Agent, or Firm* — Rossi, Kimms & McDowell LLP

(57) ABSTRACT

An information processing apparatus improved in the convenience of a program update operation performed by a user. A CPU updates firmware installed in the information processing apparatus. Update information on the program is stored in a hard disk when update of the program is executed the CPU. Operation information on other programs which are not updated is stored in the hard disk. A console section displays the update information in association with the operation information, when an instruction for displaying update history of the program is input.

7 Claims, 19 Drawing Sheets

FIG. 10A

UPDATE HISTORY INFORMATION ~1001

| id | TIME | CL.VER. | PACKAGE VER. | AFFECTED RANGE |
|---|---|---|---|---|
| 4 | 20xx/xx/xx xx:xx:xx | 00.62 | +ccc-0.1.0-0 | SEND/FAX TRANSMISSION |
| 5 | 20xx/xx/xx xx:xx:xx | 00.63 | +aaa-1.0.0-0<br>+bbb-1.0.0-0 | UI<br>PRINT/PAPER HANDLING |
| 6 | 20xx/xx/xx xx:xx:xx | 00.64 | +ccc-1.0.0-0 | SEND/FAX TRANSMISSION |
| 7 | 20xx/xx/xx xx:xx:xx | 00.65 | +aaa-2.0.0-0<br>+bbb-2.0.0-0 | SCAN<br>PRINT/PAPER HANDLING |
| ⋮ | ⋮ | | | |

FIG. 10B

AFFECTED RANGE INFORMATION ~1002

| AFFECTED FUNCTION | FLAG |
|---|---|
| SCAN | ○ |
| PRINT/PAPER HANDLING | ○ |
| SEND/FAX TRANSMISSION | × |
| SEND/FAX/PDL RECEPTION | × |
| UI | × |
| N/W | × |
| CUSTOMIZED APPLICATION PLATFORM | × |

FIG. 10C

JOB HISTORY INFORMATION ~1003

| id | TIME | JOB TYPE | NUMBER OF COPIES | NUMBER OF PAGES | OK/NG | UPDATE HISTORY ID |
|---|---|---|---|---|---|---|
| 1 | 20xx/xx/xx xx:xx:xx | COPY | 10 | 30 | OK | 4 |
| 2 | 20xx/xx/xx xx:xx:xx | PRINT | 1 | 2 | OK | 5 |
| 3 | 20xx/xx/xx xx:xx:xx | PRINT(CUSTOM) | 5 | 4 | NG | 5 |
| 4 | 20xx/xx/xx xx:xx:xx | PRINT(CUSTOM) | 3 | 15 | OK | 5 |
| 5 | 20xx/xx/xx xx:xx:xx | PRINT | 3 | 4 | OK | 5 |
| 6 | 20xx/xx/xx xx:xx:xx | SEND | 1 | 1 | OK | 5 |
| ... | | | | | | |

FIG. 10D

SYSTEM OPERATION HISTORY INFORMATION ~1004

| id | TIME | EVENT | UPDATE HISTORY ID |
|---|---|---|---|
| 1 | 20xx/xx/xx xx:xx:xx | ECODEXXX | 1 |
| 2 | 20xx/xx/xx xx:xx:xx | ECODEXXX | 1 |
| 3 | 20xx/xx/xx xx:xx:xx | JAM | 2 |
| 4 | 20xx/xx/xx xx:xx:xx | JAM | 2 |
| 5 | 20xx/xx/xx xx:xx:xx | JAM | 7 |
| 6 | 20xx/xx/xx xx:xx:xx | JAM | 7 |
| ... | | | |

FIG. 10E

CUSTOMIZED APPLICATION HISTORY INFORMATION ~1005

| id | TIME | EVENT | UPDATE HISTORY ID |
|---|---|---|---|
| 1 | 20xx/xx/xx xx:xx:xx | CustomPrint APPLICATION: INSTALL | 5 |
| 2 | 20xx/xx/xx xx:xx:xx | CustomSend APPLICATION: INSTALL | 8 |

FIG. 11

OPERATION RECORD INFORMATION
1101

| CL VER. | COPY (OK/NG) | PRINT (OK/NG) | PRINT (CUSTUM) (OK/NG) | SEND (OK/NG) | TOTAL NUMBER OF JOBS | TOTAL NUMBER OF PRINTS | OPERATION TIME PERIOD | SYSTEM ERROR | AFFECTED RANGE | CUSTOMIZED APPLICATION |
|---|---|---|---|---|---|---|---|---|---|---|
| 62 | 300 (295/5) | 400 (400/0) | 0 (0/0) | 50 (50/0) | 850 | 3000 | 12 DAYS | ECODE:0 JAM:0 | SEND/FAX TRANSMISSION | NO CUSTOMIZED APPLICATION |
| 63 | 500 (498/2) | 750 (750/0) | 250 (250/0) | 100 (10/0) | 1600 | 10000 | 90 DAYS | ECODE:0 JAM:0 | UI PRINT/PAPER HANDLING | CustomPrint APPLICATION : INSTALL |
| 64 | 100 (90/10) | 500 (490/10) | 0 (0/0) | 100 (100/0) | 700 | 1200 | 20 DAYS | ECODE:0 JAM:0 | SEND/FAX TRANSMISSION | CustomPrint APPLICATION : IN OPERATION |
| 65 | 1 (0/1) | 1 (0/1) | 1 (0/1) | 0 (0/0) | 2 | 0 | 10 DAYS | ECODE:0 JAM:2 | SCAN PRINT/PAPER HANDLING | CustomPrint APPLICATION : IN OPERATION |
| ... | | | | | | | | | | |

FIG. 13A

SELECT METHOD OF SEARCHING FOR CONTENT LISTS
IN THE PAST INDICATING FIRMWARE TO BE RESTORED

- SEARCH FROM UPDATE TIME ~1301
- SEARCH FROM FUNCTION ~1302
- SEARCH FROM JOB HISTORY ~1303

FIG. 13B

INPUT UPDATE TIME RANGE

From: 20XX/XX/XX    To: 20XX/XX/XX

RETURN    SEARCH

FIG. 14A

SELECT CONTENT LIST IN THE PAST INDICATING FIRMWARE TO BE RESTORED

| CONTENT LIST VERSION | UPDATED DATE AND TIME | AFFECTED FUNCTION | OPERATION RESULT | ERROR INFORMATION | CUSTOMIZED APPLICATION |
|---|---|---|---|---|---|
| 00.65 | 20XX.XX.XX XX:XX:XX | COPY (SCAN · PRINT) | OPERATION TIME PERIOD:13 DAYS NUMBER OF JOBS:21 | PAPER JAM: TWICE | CustomPrint APPLICATION |
| 00.64 | 20XX.XX.XX XX:XX:XX | SEND/FAX TRANSMISSION | OPERATION TIME PERIOD:20 DAYS NUMBER OF JOBS:55 | NO ERROR | CustomPrint APPLICATION |
| 00.63 | 20XX.XX.XX XX:XX:XX | PRINT·UI | OPERATION TIME PERIOD:90 DAYS NUMBER OF JOBS:803 | NO ERROR | CustomPrint APPLICATION |
| 00.62 | 20XX.XX.XX XX:XX:XX | SEND/FAX TRANSMISSION | OPERATION TIME PERIOD:12 DAYS NUMBER OF JOBS:87 | NO ERROR | NO CUSTOMIZED APPLICATION |
| 00.61 | 20XX.XX.XX XX:XX:XX | NETWORK | OPERATION TIME PERIOD:90 DAYS NUMBER OF JOBS:765 | NO ERROR | NO CUSTOMIZED APPLICATION |
| 00.59 | 20XX.XX.XX XX:XX:XX | SEND/FAX/PDL RECEPTION | OPERATION TIME PERIOD:120 DAYS NUMBER OF JOBS:994 | NO ERROR | NO CUSTOMIZED APPLICATION |

1305

RETURN | JUMP TO NEXT CHOICES 1306

OK 1307

FIG. 15A

SELECT JOB HISTORY

| DATE AND TIME | JOB TYPE | NUMBER OF COPIES | TOTAL NUMBER OF PAGES | EXECUTION RESULT |
|---|---|---|---|---|
| 20xx.xx.xx xx:xx:xx | COPY | 13 | 30 | OK |
| 20xx.xx.xx xx:xx:xx | PRINT | 1 | 2 | OK |
| 20xx.xx.xx xx:xx:xx | PRINT | 5 | 4 | OK |
| 20xx.xx.xx xx:xx:xx | PRINT (CUSTOMIZED APPLICATION) | 3 | 15 | NG |
| 20xx.xx.xx xx:xx:xx | PRINT (CUSTOMIZED APPLICATION) | 3 | 4 | OK |
| 20xx.xx.xx xx:xx:xx | SEND TRANSMISSION | 1 | 1 | OK |

[RETURN] [NEXT]

INFORMATION PROCESSING APPARATUS, INCLUDING UPDATING OF PROGRAM AND PROGRAM INFORMATION, AND METHOD OF UPDATING PROGRAM OF THE INFORMATION PROCESSING APPARATUS

This application is a U.S. National Phase Application of PCT International Application PCT/JP2011/071941 filed on Sep. 20, 2011 which is based on and claims priority from JP 2010-212379 filed on Sep. 22, 2010 the contents of which is incorporated herein in its entirety by reference.

TECHNICAL FIELD

The present invention relates to an information processing apparatus which is capable of performing differential update of firmware downloaded from a server via a network, and a method of updating a program of the information processing apparatus.

BACKGROUND ART

Conventionally, the update of firmware (a program executed by an information processing apparatus) of the information processing apparatus, such as a digital multi-function peripheral, is generally performed by a service person using firmware stored e.g. in a removable memory. On the other hand, with development of the Internet environment in recent years, it is a common practice for users to download only a portion of firmware with which the update is to be executed, from the Internet into an information processing apparatus, and thereby execute the update of the firmware.

Firmware to which users perform updating of previous version is quality-guaranteed by a manufacturer of the information processing apparatus, and is provided on the precondition that even after the update, there is no problem in the operation of the information processing apparatus.

However, some information processing apparatuses can have a so-called third party program installed therein which has been created by other than the manufacturer of the information processing apparatus. In this case, the manufacturer of the information processing apparatus does not guarantee the quality of a combination of the third party program and the updated firmware, so that an abnormality may occur in the operation of the information processing apparatus due to the firmware update. For this reason, for the user of the information processing apparatus to safely perform the firmware update, it is preferable that when an abnormality occurs in the operation of the information processing apparatus, the user himself/herself can restore the firmware to a stable state thereof before the update without fail.

For the user to restore the firmware of the information processing apparatus to the state before the update, the user himself/herself has to determine to which state in the past the firmware is to be restored. To do this, it is necessary to provide the user with information based on which the user can make the determination. It is envisaged to determine, as the information to be provided to the user, which state in the past the firmware should be restored to, by analyzing the operating conditions of the information processing apparatus in the past. Further, there has been proposed a technique of restoring firmware to a state thereof at an appropriate time point by analyzing operating conditions of the information processing apparatus (see e.g. PTL (patent Literature) 1).

CITATION LIST

Patent Literature

PTL 1: Japanese Laid-open patent publication No. 2006-344098

SUMMARY OF INVENTION

Technical Problem

However, if a third party program has been installed in the information processing apparatus, the proper restoration of the firmware requires not only analysis on the operating conditions of the information processing apparatus, but also information based on a relationship between the firmware and the third party program.

Further, even when the user notices an abnormality in the information processing apparatus due to the firmware update, to cause the user to restore the firmware to a state thereof at the appropriate time point in the past, it is necessary to provide information e.g. on the update time in the past, associated with a function or a job on which the user noticed the abnormality.

The present invention has been made in view of these problems, and provides an information processing apparatus improved in the convenience of a program update operation performed by a user, and a program update method executed by the information processing apparatus.

Solution to Problem

Accordingly, in a first aspect of the present invention, there is provided an information processing apparatus comprising an update unit configured to update a program installed in the information processing apparatus, an update information storage unit configured to store update information on the program, when update of the program is executed by the update unit, an operation information storage unit configured to store operation information on other programs which are not updated by the update unit, and a display unit configured to display the update information in association with the operation information, when an instruction for displaying update history of the program is input.

Accordingly, in a second aspect of the present invention, there is provided a method of controlling an information processing apparatus comprising updating a program installed in the information processing apparatus, storing update information on the program, when update of the program is executed by the updating, storing operation information on other programs which are not updated by the updating, and displaying the update information in association with the operation information, when an instruction for displaying update history of the program is input.

Advantageous Effects of Invention

According to the present invention, the user can properly restore a program to a state thereof in the past before the update, and it is possible to improve the convenience of the program update operation performed by the user.

Further features of the present invention will become apparent from the following description of exemplary embodiments with reference to the attached drawings.

BRIEF DESCRIPTION OF DRAWINGS

FIGS. 7A and 7B are diagrams illustrating examples of firmware update screens displayed on a console section, in which FIG. 7A illustrates a download start screen, and FIG. 7B illustrates an install start screen.

FIGS. 10A to 10E are diagrams illustrating examples of respective types of history information recorded and managed by the multifunction peripheral, in which FIG. 10A illustrates update history information, FIG. 10B illustrates affected range information, FIG. 10C illustrates job history information, FIG. 10D illustrates system operation history information, and FIG. 10E illustrates customized application history information.

FIG. 11 is a diagram illustrating an example of operation record information recorded and managed by the multifunction peripheral.

FIGS. 13A and 13B are diagrams illustrating examples of screens displayed on the console section in the content list selection process, in which FIG. 13A illustrates a content list search method selection screen, and FIG. 13B illustrates an update time input screen.

FIGS. 14A and 14B are diagrams illustrating examples of screens displayed on the console section in the content list selection process, in which FIG. 14A illustrates a content list selection screen, and FIG. 14B illustrates a function selection screen.

FIGS. 15A and 15B are diagrams illustrating examples of screens displayed on the console section in the content list selection process, in which FIG. 15A illustrates a job history record selection screen, and FIG. 15B illustrates a job history search method selection screen.

DESCRIPTION OF EMBODIMENTS

The present invention will now be described in detail below with reference to the drawings showing an embodiment thereof.

Figure 1:
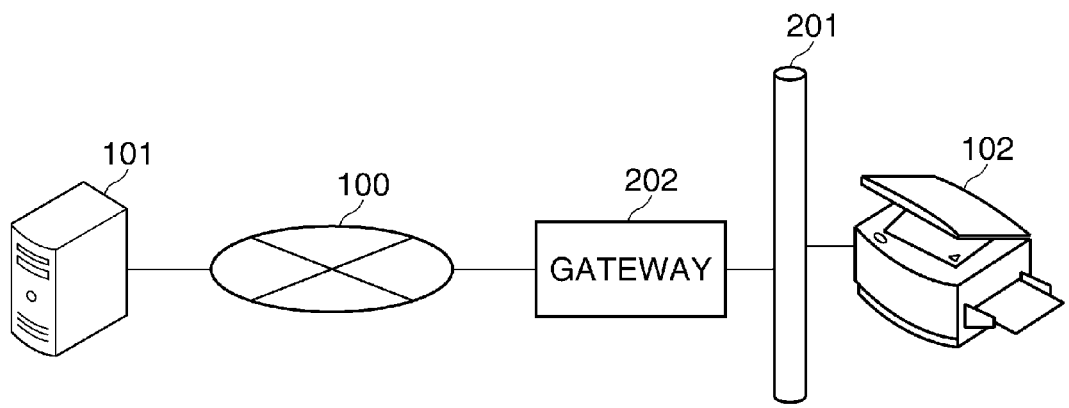
FIG. 1 is a diagram illustrating an example of a network environment in which an information processing apparatus according to an embodiment of the present invention is installed.

FIG. 1 illustrates an example of a network environment in which an information processing apparatus according to an embodiment of the present invention is installed.

In FIG. 1, reference numeral 101 denotes a content server connected to the Internet 100. Reference numeral 102 denotes the information processing apparatus according to the present embodiment, which is e.g. a digital multifunction peripheral (hereinafter simply referred to as the "multifunction peripheral") installed at a customer's site. The multifunction peripheral 102 is connected to a LAN (local area network) 201, such as an Ethernet (registered trademark), and is connected to the Internet 100 via a gateway 202. Note that although in the illustrated example, one multifunction peripheral 102 is connected to the LAN 201, a plurality of multifunction peripherals may be connected, or other apparatuses, such as a PC (personal computer), may be connected.

The content server 101 has a function of distributing firmware configuration information necessary for updating firmware (program) and differential modules to be installed when the firmware is updated via the Internet 100. Note that the term "firmware update" in the present embodiment is intended to include both the meanings of the update and downgrade of firmware.

Figure 2:
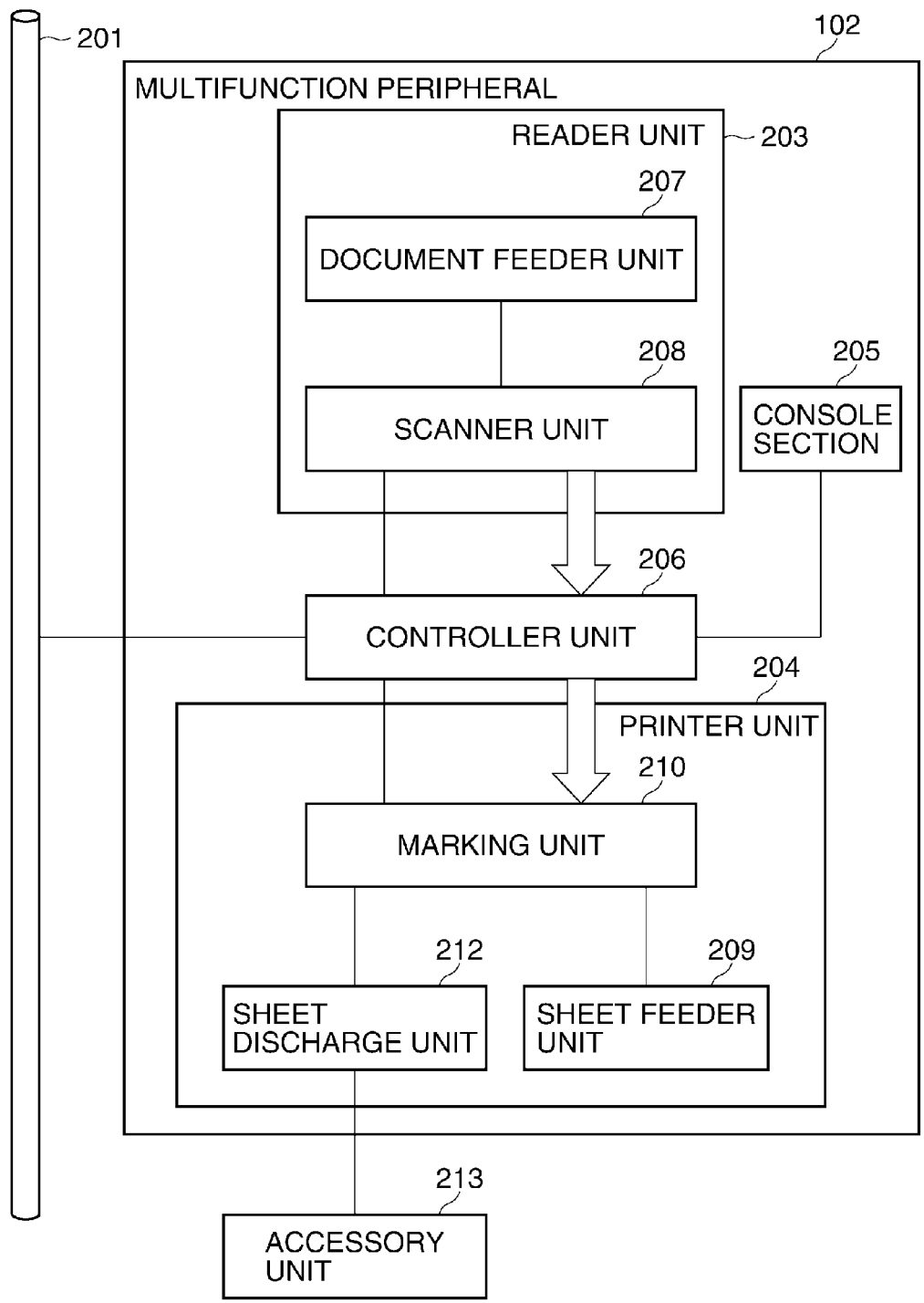
FIG. 2 is a schematic block diagram of a multifunction peripheral appearing in FIG. 1.

FIG. 2 is a schematic block diagram of the multifunction peripheral 102 appearing in FIG. 1.

The multifunction peripheral 102 includes a reader unit 203 which performs read processing for reading an image from a document, and a printer unit 204 which performs processing for outputting (printing) image data and the like obtained by the read processing. The multifunction peripheral 102 further includes a console section 205 having arranged thereon a liquid crystal panel for displaying image data and various kinds of functions, operation keys, and buttons. Further, the multifunction peripheral 102 includes a controller unit 206 which is connected to these sections and controls the sections. The controller unit 206 is connected to the LAN 201.

The reader unit 203 includes a document feeder unit (DF unit) 207 which conveys document sheets, and a scanner unit 208 which optically reads a document image and converts the read image into image data as electrical signals.

The printer unit 204 includes a sheet feeder unit 209 having a plurality of sheet cassettes in which recording sheets are housed, a marking unit 210 that transfers image data to a recording sheet and fixes the transferred image data thereon, and a sheet discharge unit 212 that discharges the printed recording sheet to the outside. The sheet discharge unit 212 can be connected to an accessory unit 213 disposed outside the multifunction peripheral 102, and can discharge recording sheets to the accessory unit 213. The accessory unit 213 performs finishing processing, such as sorting and stapling, and then discharges the recording sheets. Further, in the case of a multifunction peripheral having a facsimile function, a FAX transmission section is equipped in the accessory unit 213.

Figure 3:
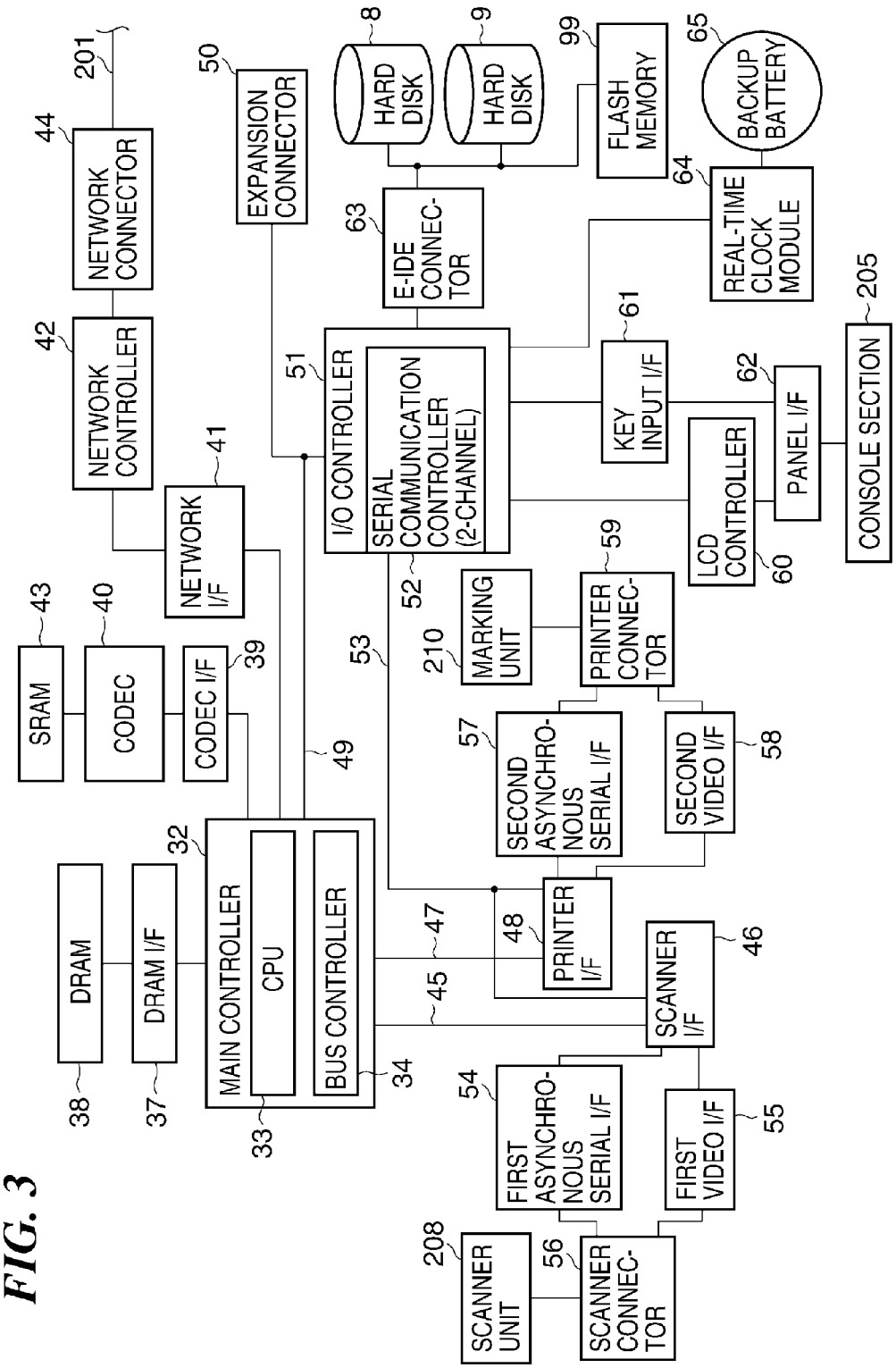
FIG. 3 is a schematic block diagram of a controller unit appearing in FIG. 2.

FIG. 3 is a schematic block diagram of the controller unit 206 appearing in FIG. 2.

A main controller 32 incorporates a CPU 33 and a bus controller 34, and controls functional blocks, described hereinafter. Further, the main controller 32 is connected to a DRAM (dynamic random access memory) 38 via a DRAM interface 37. The main controller 32 is further connected to a codec 40 via a codec interface 39. Further, the main controller 32 is connected to a network controller 42 via a network interface 41.

The DRAM 38 is used as a work area for use by the CPU 33, and is also used to store image data. The codec 40 compresses raster image data stored in the DRAM 38 using a known compression method, such as MH, MR, MMR, or JBIG, and decompresses compressed data into raster image data. The codec 40 is connected to an SRAM (static random access memory) 43, which is used by the codec 40 as a temporary work area. The network controller 42 carries out predetermined control of communication with the LAN 201 via a network connector 44.

The main controller 32 is also connected to a scanner interface 46 via a scanner bus 45, to a printer interface 48 via a printer bus 47, and to an expansion connector 50 for connection to an expansion board and an input/output controller (I/O controller) 51, via a general-purpose high-speed bus 49, such as a PCI bus.

The I/O controller 51 includes a 2-channel asynchronous serial communication controller 52 for transmitting and receiving control commands to and from the reader unit 203 and the printer unit 204. The serial communication controller 52 is connected to the scanner interface 46 and the printer interface 48 via an I/O bus 53.

The scanner interface 46 is connected to a scanner connector 56 via a first asynchronous serial interface 54 and a first video interface 55. The scanner connector 56 is connected to the scanner unit 208 of the reader unit 203. The scanner interface 46 performs desired binarization processing and scaling processing in the main scanning direction and/or in the sub-scanning direction on image data received from the scanner unit 208. Further, the scanner interface 46 produces a control signal based on a video signal received from the scanner unit 208, and transfers the control signal to the main controller 32 via the scanner bus 45.

The printer interface 48 is connected to a printer connector 59 via a second asynchronous serial interface 57 and a second video interface 58. The printer connector 59 is connected to the marking unit 210 of the printer unit 204. The printer interface 48 performs smoothing on image data output from the main controller 32 and outputs the resultant image data to the marking unit 210. The printer interface 48 also outputs a control signal produced based on a video signal received from the marking unit 210 to the printer bus 47. For example, the printer interface 48 interprets PDL (page description language) data which the main controller 32 has received from a host computer connected to the LAN 201 and has transferred to the printer interface 48, to thereby convert the PDL data into raster image data.

The bus controller 34 controls the transfer of data that is input from and output to external apparatuses connected to the scanner interface 46, the printer interface 48, the expansion connector 50, etc. More specifically, the bus controller 34 performs arbitration when there is a bus conflict and controls DMA data transfer. For example, the data transfer between the DRAM 38 and the codec 40, the data transfer from the scanner unit 208 to the DRAM 38, the data transfer from the DRAM 38 to the marking unit 210, etc. mentioned above are carried out by DMA transfer under the control of the bus controller 34.

The I/O controller 51 is connected to a panel interface 62 via an LCD controller 60 and a key input interface 61. The panel interface 62 is connected to the console section 205. The I/O controller 51 is connected to hard disks 8 and 9, and a flash memory 99 via an E-IDE connector 63. The flash memory 99 stores various kinds of control programs executed by the main controller and various items of data.

The I/O controller 51 is also connected to a real-time clock module 64 that updates/stores date and time managed in the digital multifunction peripheral. The real-time clock module 64 is connected to and backed up by a backup battery 65.

Figure 4:
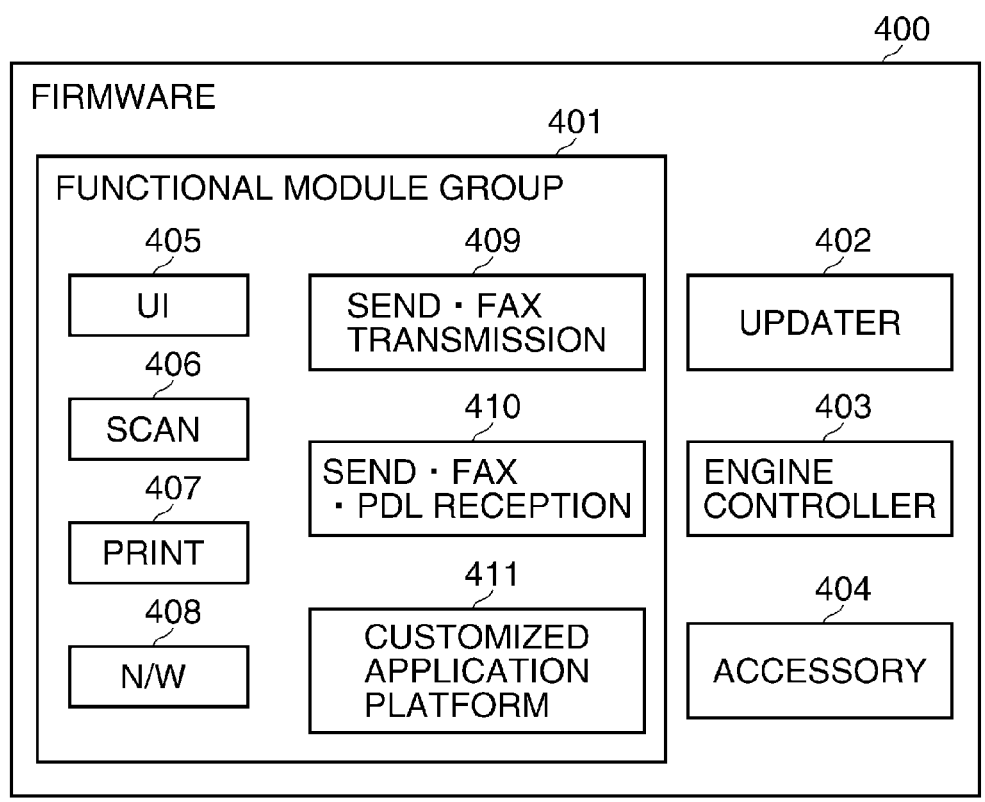
FIG. 4 is a schematic diagram of the configuration of firmware of the multifunction peripheral.

FIG. 4 is a schematic diagram of the configuration of firmware of the multifunction peripheral 102.

A firmware 400 of the multifunction peripheral 102 comprises a function module group 401 normally used by the user, an updater 402, an engine controller 403, and an accessory 404. The updater 402 is started when the firmware is updated or downgraded. The engine controller 403 is a controller module for controlling the print engine (not shown) of the printer unit 204. The accessory 404 is a controller module for controlling the accessory unit 213. The function module group 401 and the updater 402 are stored in the flash memory 99. The engine controller 403 is stored in the printer unit 204, and the accessory 404 is stored in the accessory unit 213.

First, a description will be given of modules of the function module group 401.

A UI (user interface) 405 is a module which operates when the user operates the console section 205. A scan 406 is a controller module for controlling the reader unit 203, and a print 407 is a controller module for controlling the printer unit 204 (higher-level controller module for the engine controller 403 which provides instructions to the print engine itself).

A N/W (network) 408 is a module for communicating with other apparatuses on the network, and receives a print instruction and the like via the network. A SEND•FAX transmission 409 is a module which transmits (sends) image data read on the multifunction peripheral 102 as a mail attachment, and transmits (sends by facsimile) the read image data to the outside by facsimile transmission. A SEND•FAX•PDL reception 410 is a module which receives sent data, facsimile data, and PDL data via the N/W 408 from an external network.

A customized application platform 411 is a module which provides an operating environment for customized applications installed into the multifunction peripheral 102 by the user. The customized applications include third party applications. Note that the above-mentioned function module group 401 shows an example of modules included in a general multifunction peripheral, and the multifunction peripheral 102 may have function modules other than the above-mentioned modules.

Next, before describing the firmware downgrade in the present embodiment, the outline of the firmware update as the basis will be described with reference to FIGS. 5, 6, 7A, and 7B.

Figure 5:
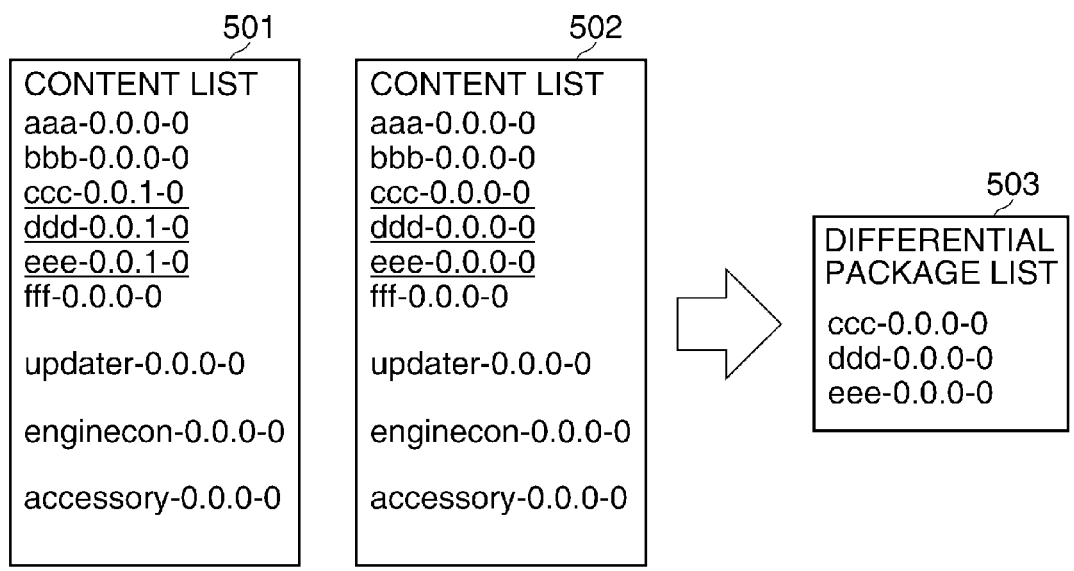
FIG. 5 is a diagram illustrating examples of lists of modules provided in the multifunction peripheral.

FIG. 5 illustrates examples of lists of modules provided in the multifunction peripheral 102.

In FIG. 5, reference numerals 501 and 502 each denote an example of a list of modules called "packages" provided in the multifunction peripheral 102 (hereinafter also referred to as the "content list"). The firmware of the multifunction peripheral 102 is formed by a group of these packages.

The firmware of the multifunction peripheral 102 is managed by the content server 101 on a content list basis. When the multifunction peripheral 102 performs the program update (update or downgrade), the multifunction peripheral 102 changes a version of the content list, receives differential packages in a differential package list 503, referred to hereinafter, at the time, from the content server 101, and installs the differential packages. The packages in the content list are stored in the flash memory 99 of the controller unit 206, the printer unit 204, and the accessory unit 213, respectively. One or a plurality of packages correspond to each module of the firmware 400 shown in FIG. 4.

Next, a description will be given of a firmware update process with reference to FIG. 6.

Figure 6:
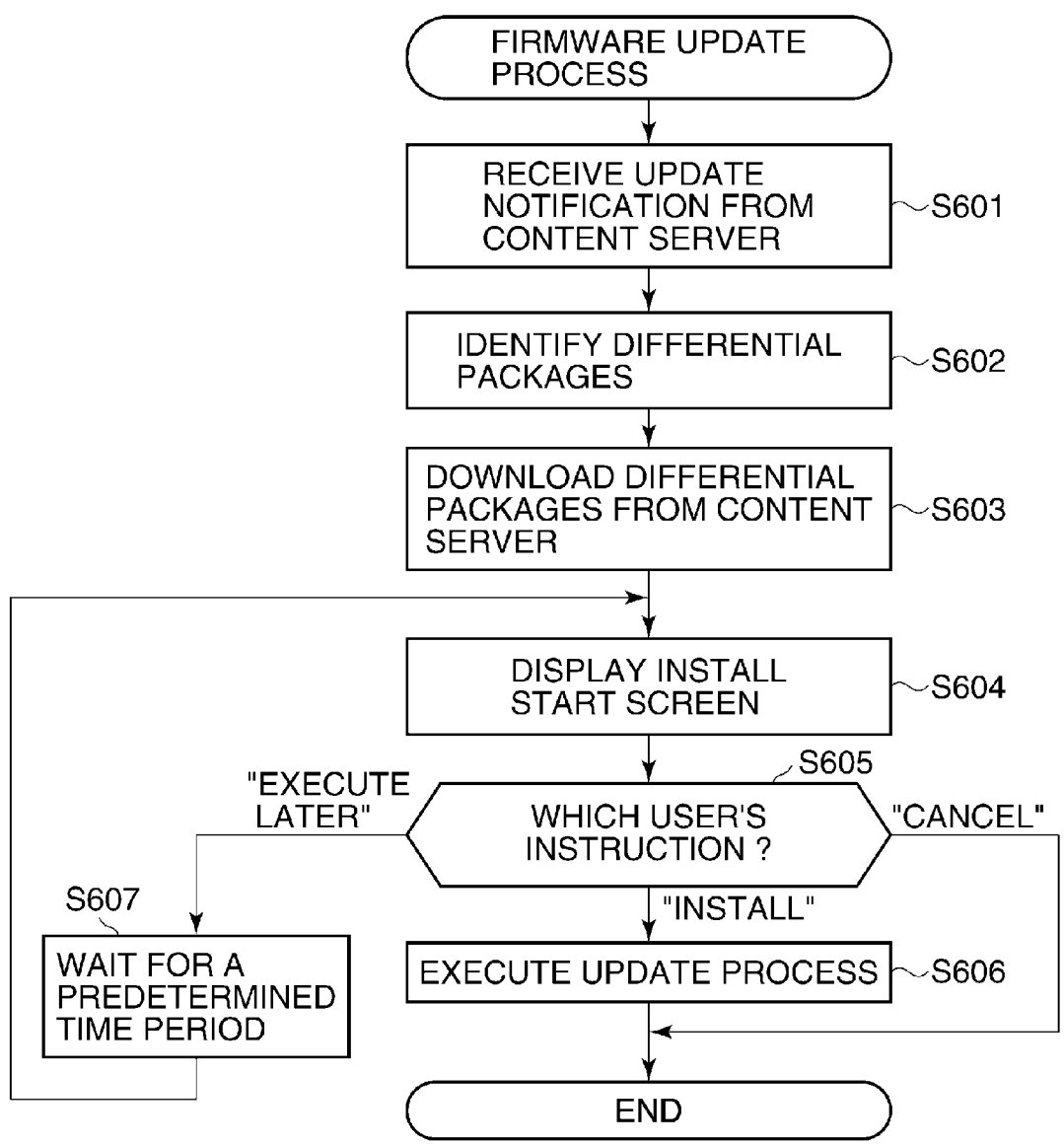
FIG. 6 is a flowchart of a firmware update process performed by the multifunction peripheral.
Figure 7A:
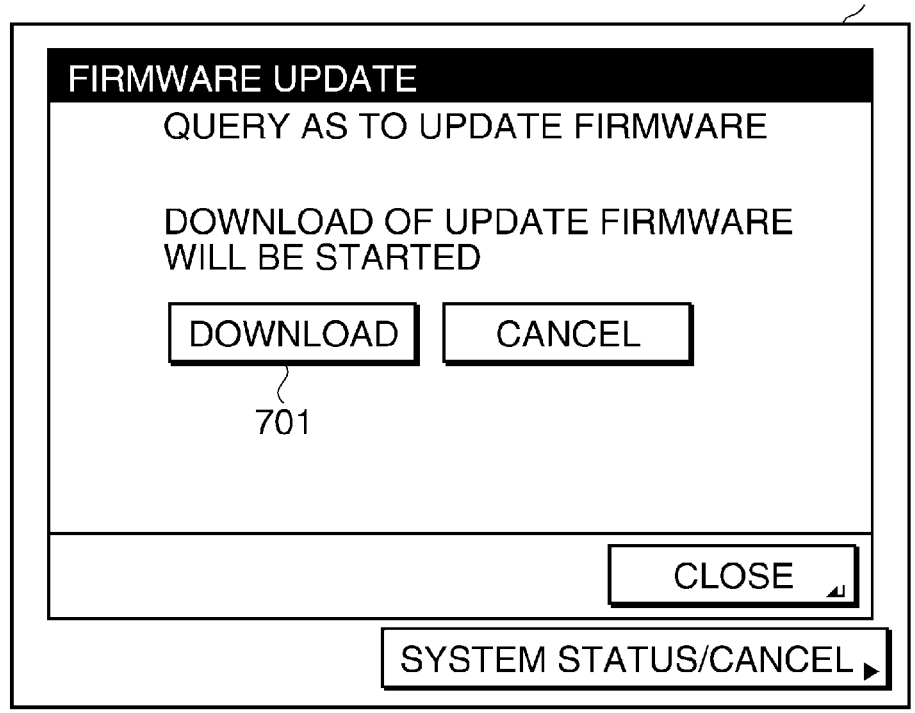
Figure 7B:
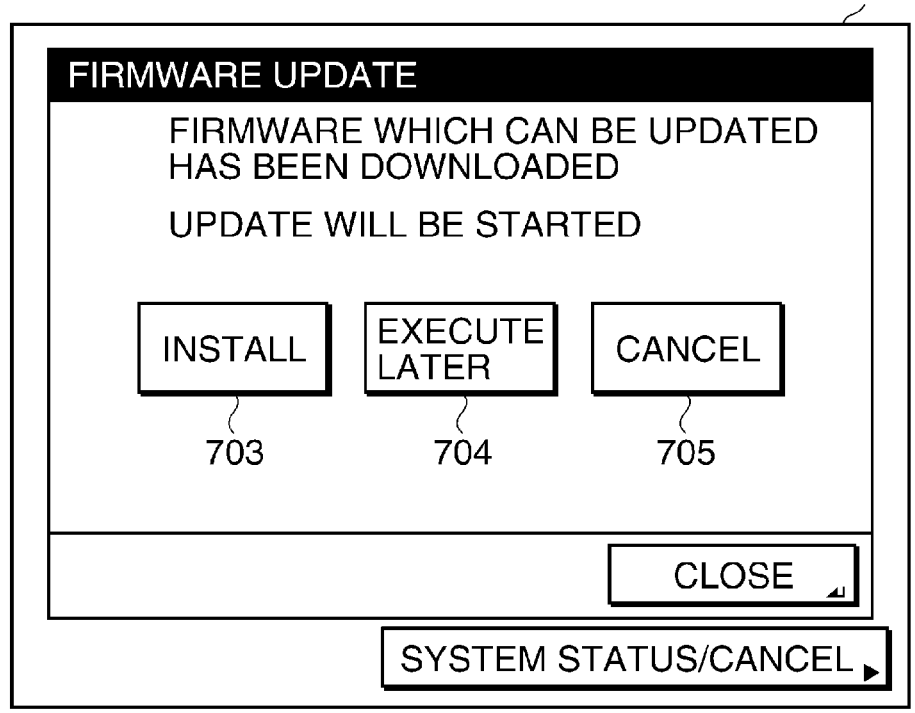

FIG. 6 is a flowchart of the firmware update process performed by the multifunction peripheral 102. Note that the process shown in FIG. 6 is executed by the CPU 33 according to a program stored in the flash memory 99 appearing in FIG. 3.

First, in a step S601, the CPU 33 receives a firmware update notification from the content server 101 via the Internet 100, the LAN 201, and the like. In response to this, the CPU 33 starts the updater 402 which is an update tool in the flash memory 99. Note that the user may start the update tool, and depress a "download" button 701 on a download start screen 700, shown in FIG. 7A, which is displayed on the console section 205 to thereby query the content server 101 as to an update package.

Next, in a step S602, the CPU 33 identifies differential packages which require the update based on the contents of the update notification received from the content server 101. For example, as shown in FIG. 5, a comparison is made between the content list 501 before the update, which is stored in e.g. the hard disk 8 of the multifunction peripheral 102, and the content list 502 after the update, which is sent from the content server 101 and stored in the hard disk 8, to thereby identify differential packages and create the differential package list 503 of these differential packages.

In a step S603, the CPU 33 downloads the differential packages identified in the step S602 from the content server 101. Then, the CPU 33 displays an install start screen 702 shown in FIG. 7B on the console section 205 (step S604). Then, the CPU 33 prompts the user to select one of an "install" button 703, "execute later" button 704, and a "cancel" button 705 (step S605).

If the user selects and depresses the "install" button 703 on the install start screen 702, the CPU 33 executes update processing using the downloaded differential packages (step S606). On the other hand, if the user selects and depresses the "execute later" button 704 on the install start screen 702, the CPU 33 waits for a predetermined time period (step S607), and then displays the install start screen 702 on the console section 205 again (step S604). Further, if the user selects and depresses the "cancel" button 705 on the install start screen 702, the CPU 33 immediately terminates the firmware update process.

Next, a description will be given of the outline of the firmware downgrade in the present embodiment with reference to FIGS. 8 and 9.

Figure 8:
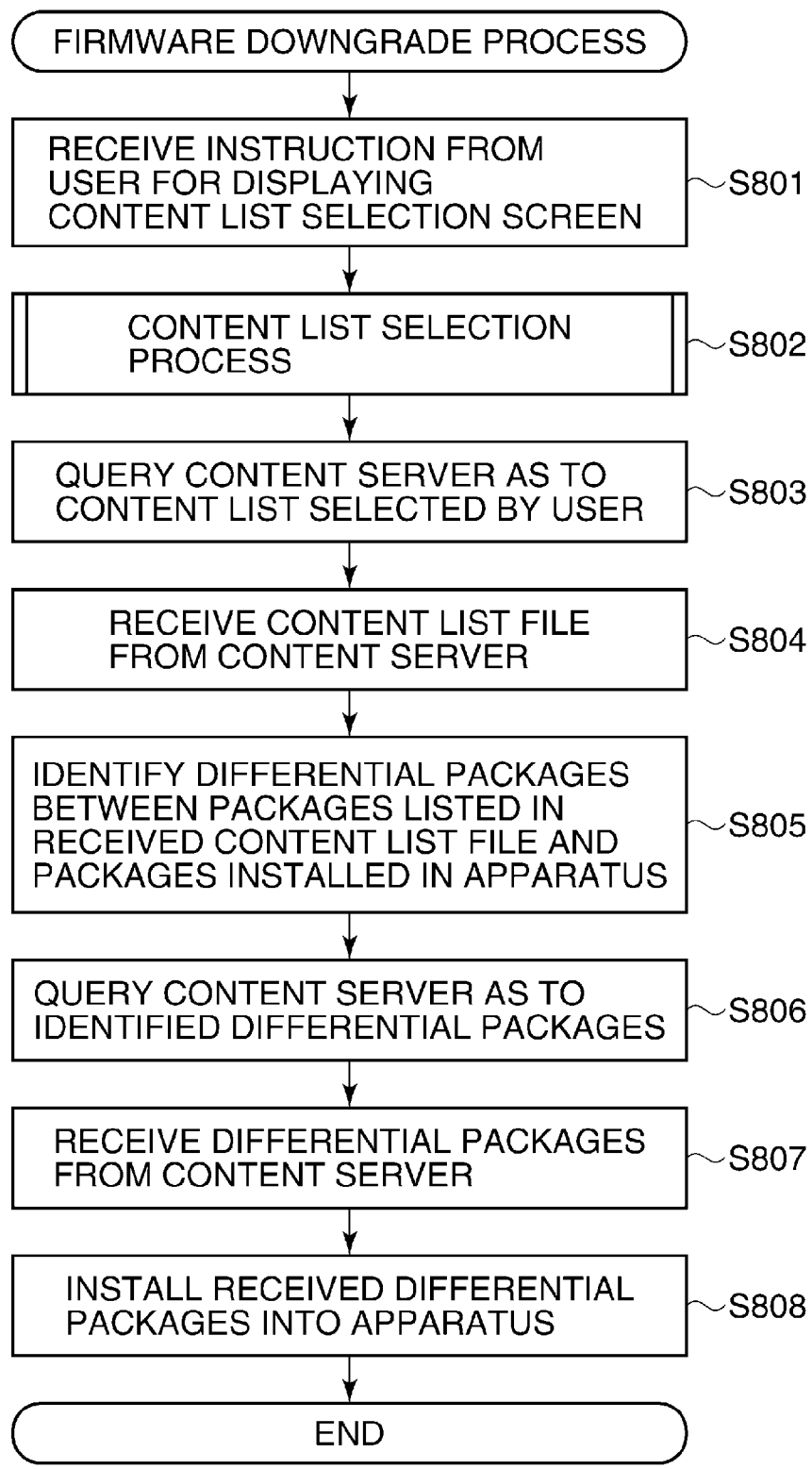
FIG. 8 is a flowchart of a firmware downgrade process performed by the multifunction peripheral.

FIG. 8 is a flowchart of a firmware downgrade process performed by the multifunction peripheral 102. Note that the firmware downgrade process shown in FIG. 8 is executed by the CPU 33 according to a program stored in the flash memory 99 appearing in FIG. 3.

Figure 9:
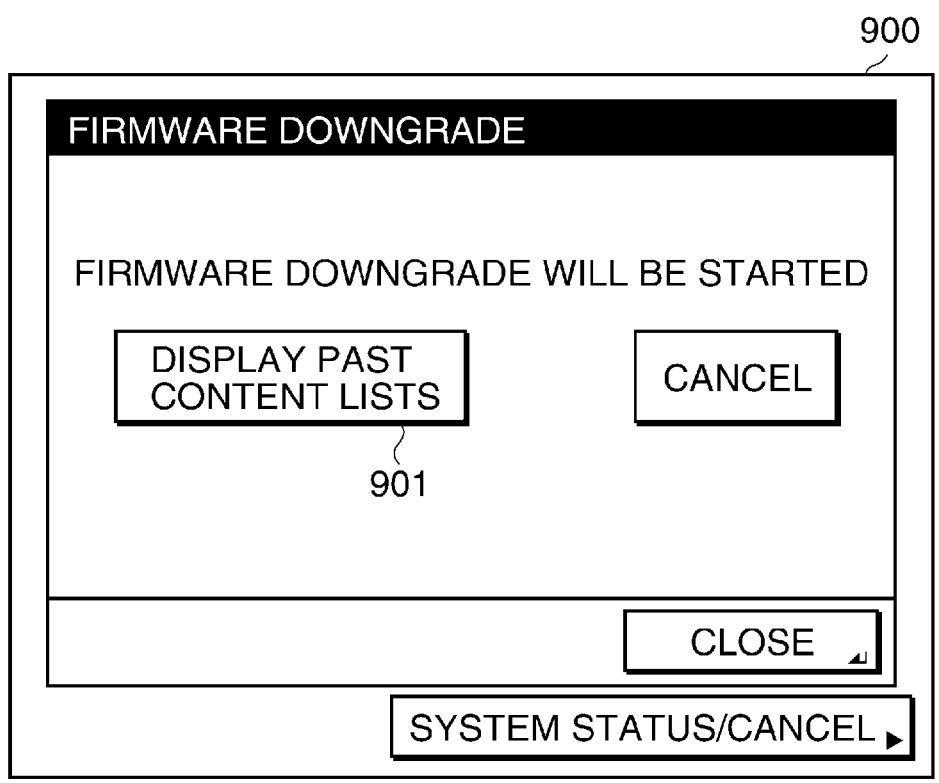
FIG. 9 is a diagram illustrating an example of a firmware downgrade screen displayed on the console section.

In a step S801, when the user depresses a "display past content lists" button 901 on a firmware downgrade start screen 900 appearing in FIG. 9, which is displayed on the console section 205, the CPU 33 receives an instruction for displaying a content list selection screen. Then, the CPU 33 executes a content list selection process in a step S802. The content list selection process will be described in detail hereinafter.

In a step S803, the CPU 33 queries the content server 101 as to a past content list selected by the user in the content list selection process in the step S802. Next, in a step S804, the CPU 33 receives a content list file from the content server 101.

In a step S805, the CPU 33 identifies differential packages from the packages listed in the received content list file and the packages which have been installed in the multifunction peripheral 102. The identification of the differential packages is performed in the same manner as in the above-mentioned step S602 in FIG. 6.

Next, in a step S806, the CPU 33 queries the content server 101 as to the identified differential packages, and receives the differential packages from the content server 101 in a step S807. Then, in a step S808, the CPU 33 installs the received differential packages, followed by terminating the firmware downgrade process. In the step S808, the CPU 33 functions as an update unit.

Next, a description will be given of the outline of the content list selection process executed in the step S802 in FIG. 8.

A case where the user has to perform the downgrade of the firmware by himself/herself is e.g. a case where an abnormality occurs in the operation of the multifunction peripheral 102 after the firmware has been updated by the user. Particularly, if a customized application which is not managed by the content server 101 has been installed in the multifunction peripheral 102, the firmware is combined with firmware of which quality is not guaranteed, which may cause the abnormality in the operation of the multifunction peripheral 102. For example, if a bug in the firmware is corrected by the update, and the customized application has been configured in association with the bug of the firmware before the update, the customized application may cease to normally operate due to the update. Further, not only when a bug is corrected, but also e.g. when inner processing of the apparatus is corrected by the update or when a method of using a memory is changed, the customized application may cease to normally operate.

The timing of the user becoming aware of an abnormality of the multifunction peripheral 102 after the firmware update depends on a state of use of the apparatus by the user. Depending on the frequency of use of the functions of the apparatus or the customized applications by the user, it can be envisaged that the user does not become aware of an abnormality of the apparatus immediately after the update. Particularly, in an environment in which the firmware update is frequently performed, it can happen that the user becomes aware of an abnormality after a plurality of updates have been performed after the update as a cause of the abnormality was performed. In this case, the user cannot determine a firmware configuration at a time point in the past to which the firmware is to be restored. Then, to perform the proper downgrade of the firmware in the timing of the user becoming aware of the abnormality, it is necessary to provide information enabling the user to determine which one of content lists used for the update in the past corresponds to a firmware configuration to which the firmware should be restored.

In the content list selection process in the present embodiment, taking into account the above case, to enable the user to properly select the past content list to which the firmware should be downgraded, the content lists as choices are retrieved and displayed based on a condition input by the user. The retrieval of the choices of content lists is performed by creating operation record information (operation history information) on operations of the multifunction peripheral 102 updated in the past to firmware configurations defined by content lists, respectively, and using the created operation record information as data to be searched.

The operation record information indicates operating conditions of the multifunction peripheral 102, and records of operation record information are associated with records of update history information in which respective versions of associated content lists in the past are recorded. Further, the records of the operation record information are associated with records of job history information (processing history information) indicative of history of processing (jobs) executed by firmware of a version associated with each content list, records of system operation history information, and records of customized application history information (installation state information).

Next, a description will be given of a method of creating the operation record information in the present embodiment with reference to FIGS. 10A to 10E, and 11.

FIG. 10A illustrates an example of the update history information in which the versions of content lists based on which update was performed in the past are recorded.

In update history information 1001, an item of "id" indicates an identifier for use in data management, and is incremented whenever firmware is updated. The "id" is used as an "update history id" for associating between each record of the update history information 1001 and each record of each of the other types of history information, described hereinafter. An item of "time" indicates date and time when the update was executed. An item of "CL Ver." indicates a version of a content list. An item of "Package Ver." indicates a file name of a differential package actually used for the update.

An item of "affected range" in the update history information 1001 is recorded based on affected range information which indicates, out of a plurality of functions equipped in the multifunction peripheral 102, a function or functions the operation of which can be affected by the update based on the content list. The affected range information is information additional to the content list. When the multifunction peripheral 102 receives a content list file from the content server 101, the multifunction peripheral 102 also receives the affected range information. The timing to receive the affected range information is e.g. execution of the step 804 in FIG. 8. FIG. 10B shows an example of the affected range information added to the content lists.

In FIG. 10B, the affected range information is denoted by reference numeral 1002. In a column of "affected function", the respective names of functions are indicated and whether or not each of these functions is to be modified is indicated by a flag. In the illustrated example, a circle represents a flag of modification while a cross represents a flag of non-modification, and FIG. 10B shows that a "scan" function and a "print/paper handling" function are to be modified from the respective functions corresponding to the last version of the content list. The functions recorded in the affected range information correspond function modules used by the user and included in the firmware configuration shown in FIG. 4.

If an update is executed by skipping a preceding version of the content list, it is also possible to store the information of the skipped version of the content list in the update history information. In this case, since the firmware corresponding to the skipped version of the content list was not installed, there are no operation records. Further, the affected range information including that of a skipped version can be stored in the update history information, e.g. by acquiring data merged with the affected range information of the skipped version of the content list when a content list file is received.

FIG. 10C illustrates an example of the job history information on jobs executed by the multifunction peripheral 102.

In the job history information, denoted by reference numeral 1003, an item of "id" indicates an identifier for use in data management, and is incremented whenever a job is executed by the multifunction peripheral 102. An item of "time" indicates date and time when the job was executed. An item of "job type" indicates a type of the executed job. An item of "number of copies" indicates the number of copies designated by the job. An item of "number of pages" indicates the number of pages on which printing was executed by the job. An item of "OK/NG" indicates a result of execution of the job, i.e. success (OK) or failure (NG) of the execution of the job.

The job history information can include items other than the above-mentioned items, and hence the items of the job history information are not limited to the above-mentioned items, but any other items may be used, if necessary. Further, although as for the "job type", in the example shown in FIG. 10C, jobs executed by a customized application are each recorded as "Print (Custom)", those jobs executed by the customized application may be stored in the job history information as a different item separately from the item of the "job type".

Further, the "update history id" indicative of a version of a content list defining a firmware configuration associated with a time point when a job was executed is added to each of job history records forming the job history information.

FIG. 10D illustrates an example of the system operation history information of the multifunction peripheral 102.

In the system operation history information, denoted by reference numeral 1004, an item of "id" indicates an identifier for use in data management, and is incremented whenever a system operation history record is recorded. An item of "time" indicates date and time when the system operation history record is recorded. An item of "event" indicates an event indicated by the system operation history record. Although in the present embodiment, the description has been given of a case where errors which occur in the multifunction peripheral 102, such as a system error represented by "ECODE" and a paper jam represented by "JAM", are recorded as events in the system operation history, this is not limitative, but any other events may be included in the system operation history.

Further, the "update history id" indicative of a version of a content list defining a firmware configuration associated with a time point when the system operation history record was recorded is added to each of system operation history records forming the system operation history information.

FIG. 10E illustrates an example of customized application history information of the multifunction peripheral 102.

In the customized application history information, denoted by reference numeral 1005, an item of "id" indicates an identifier for use in data management, and is incremented whenever a customized application history record is recorded. An item of "time" indicates date and time when the customized application is installed or uninstalled. An item of "event" indicates a name of a corresponding customized application and a detail (install or uninstall) of executed processing. If necessary, history records of events related to other customized applications may be stored for use.

Further, the "update history id" indicative of a version of a content list defining a firmware configuration associated with a time point when the customized application history was recorded is added to each of customized application history records forming the customized application history information.

The operation record information, denoted by reference numeral 1101 in FIG. 11, can be created by associating records of the update history information 1001 with records of the job history information 1003, records of the system operation history information 1004, and records of the customized application history information 1005, respectively, using the above-described "update history ids".

In the operation record information 1101, items of "CL Ver." (version of a content list), "operation time period", and "affected range" are acquired from the items of "CL Ver.", "time", and "affected range" of the update history information 1001. Note that the "operation time period" is calculated from the "time".

Further, in the operation record information 1101, the number of jobs on a job type basis, such as "Copy", "Print", and "Send", "total number of jobs", and "total number of printed sheets" (total number of pages) are acquired from the job history information 1003, i.e. from the items of "job type", "number of copies", and "number of pages" of the job history information 1003 associated with the update history information 1001 by the "update history id".

Further, items of "system error" and "customized application" are similarly acquired from the item of "event" of the system operation history information 1004 and the item of "event" of the customized application history information 1005, which are associated with the update history information 1001 by the "update history id". The created operation record information 1101 is used in the content list selection process, described in detail hereinafter.

Further, the respective types of history information shown in FIGS. 10A, and 10C to 10E, and the operation record information in FIG. 11 are stored in the hard disk 8 or the hard disk 9 by the CPU 33. In an apparatus which is not equipped with a hard disk, the above-mentioned information is stored in the flash memory 99. The hard disk 8, the flash memory 99, or the like function as an update history storage unit, a processing history storage unit, an operation history storage unit, and an installation state storage unit.

The operation record information 1101 is created when the job history information, the system operation history information, and the customized application history information are updated. Then, the operation record information 1101 is updated by identifying a difference of the operation record information. The operation record information 1101 may be created and updated based on the respective types of history information which have been stored for a predetermined time period at the timing of the update or downgrade of the firmware.

Next, a description will be given of the content list selection process executed in the step S802 in FIG. 8 with reference to FIGS. 12A and 12B, and FIGS. 13A to 15B.

Figure 12A:
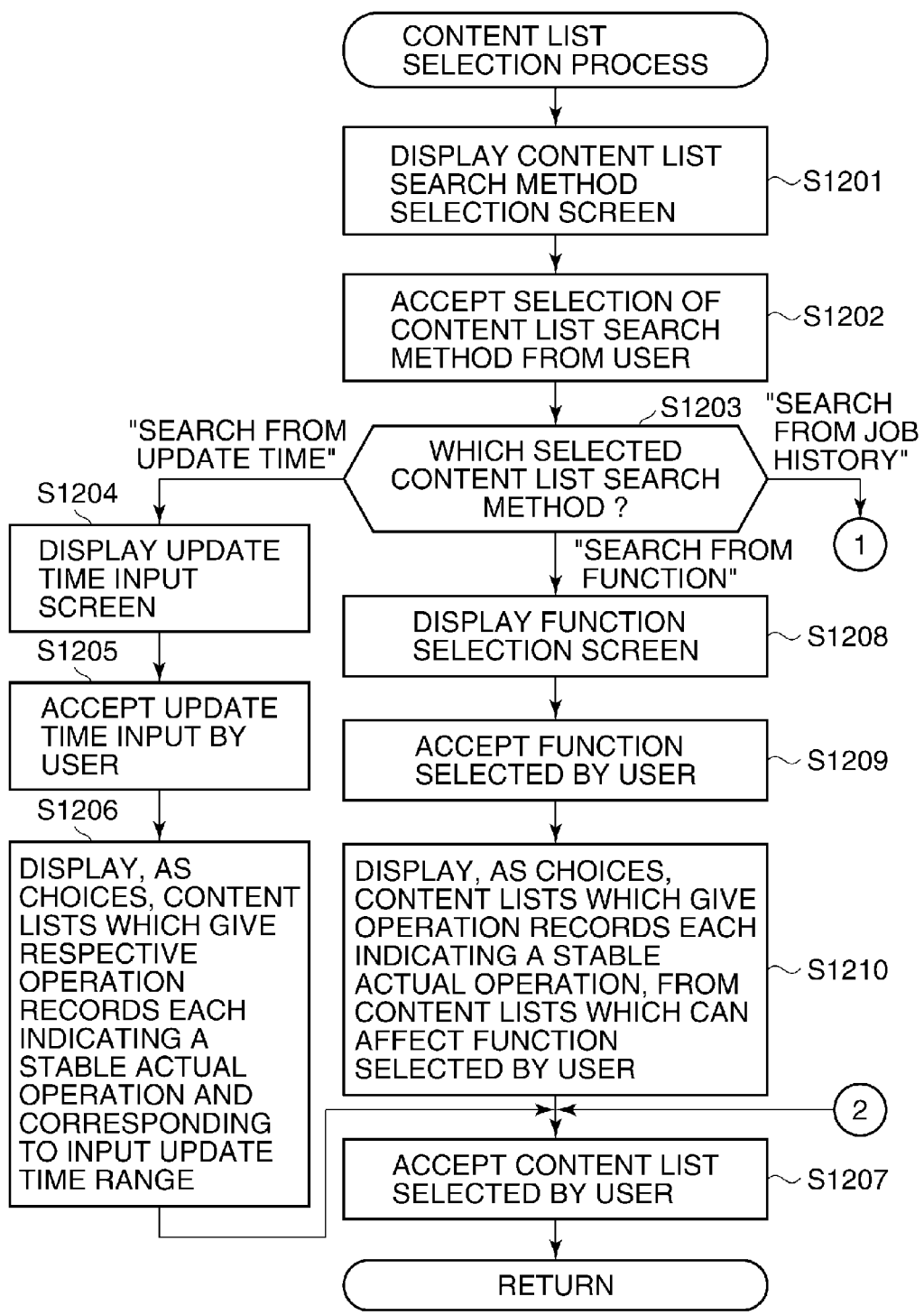
FIG. 12A is a flowchart of a content list selection process executed in a step in FIG. 8.
Figure 12B:
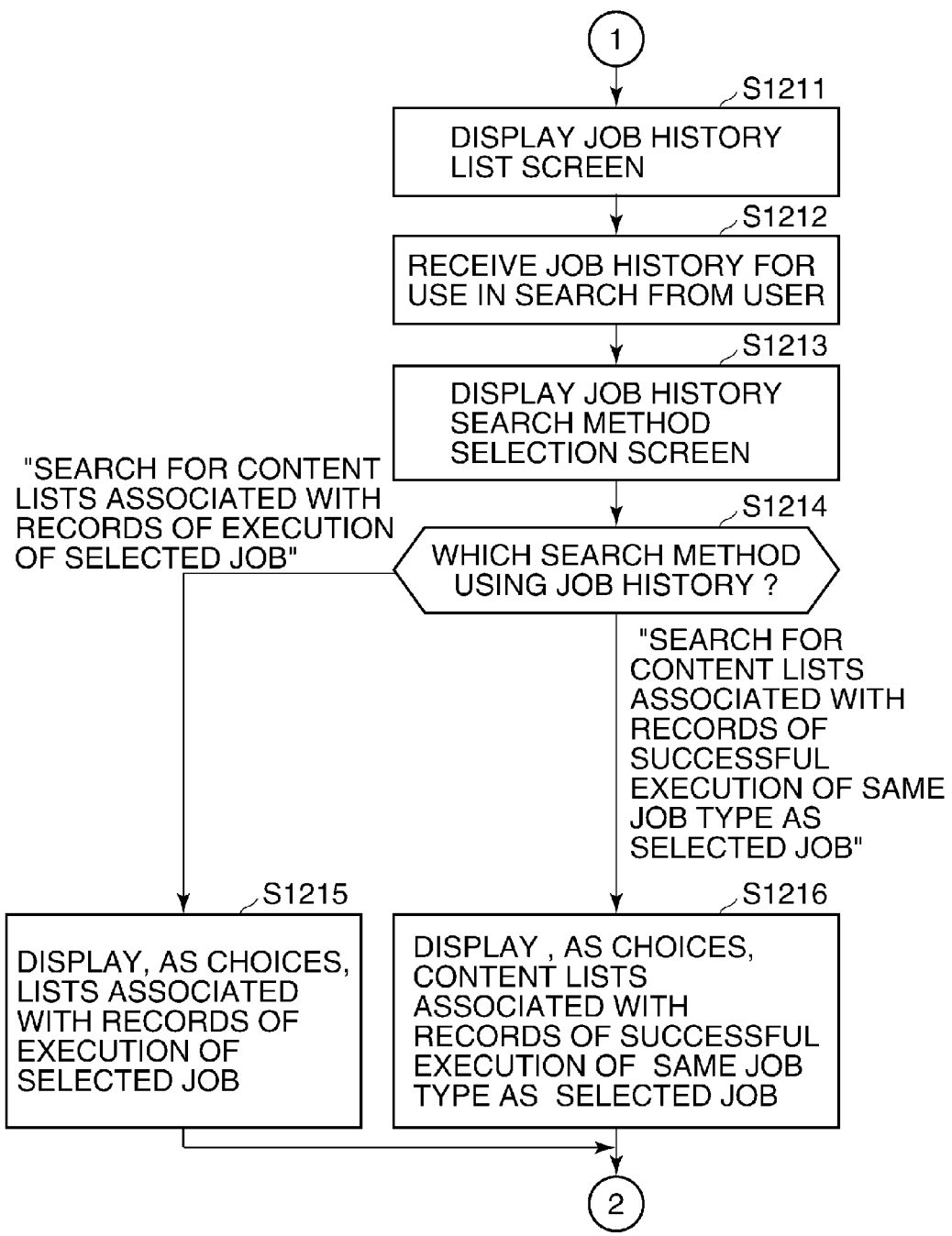
FIG. 12B is a continuation of FIG. 11.

FIGS. 12A and 12B are a flowchart of the content list selection process executed in the step S802 in FIG. 8. Note that the process shown in FIGS. 12A and 12B is executed by the CPU 33 according to a program stored in the flash memory 99 appearing in FIG. 3.

Referring to FIG. 12A, when an instruction from the user for displaying a content list selection screen is received in the step S801 in FIG. 8, the CPU 33 displays, in a step S1201, a content list search method selection screen 1300 shown in FIG. 13A on the console section 205. The user selects a search method on the content list search method selection screen 1300. In doing this, the user selects and depresses one of a "search from update time" button 1301, a "search from function" button 1302, and a "search from job history" button 1303.

In a step S1202, the CPU 33 accepts selection of the content list search method from the user, and determines which of the content list search methods is indicated by the accepted selection (step S1203). If the user has selected the "search from update time" button 1301, the CPU 33 displays an update time input screen 1304 shown in FIG. 13B on the console section 205 (step S1204).

When the user inputs an update time range on the update time input screen 1304, the CPU 33 accepts the update time range (specified by start date and time and end date and time) input by the user (step S1205). Next, in a step S1206, the CPU 33 retrieves content lists which give respective operation records each indicating a stable actual operation of the multifunction peripheral 102 out of the content lists corresponding to the update time range input by the user, and displays the retrieved content lists as choices on a content list selection screen 1305 shown in FIG. 14A on the console section 205. At this time, the console section 205 functions as a display unit. Whether or not a content list gives an operation record indicating a stable actual operation of the multifunction peripheral 102 is determined by criteria of "operation time period", "total number of jobs", "system error", and so forth of the operation record information 1101 in FIG. 11. If necessary, other items may be added.

On the content list selection screen 1305 of the illustrated example, the content lists are displayed in descending order of versions, i.e. in the order of newest to oldest. For example, the user views the information of the content lists displayed as choices, and if the user desires to select from still older content lists, the user can continue to retrieve the still older content lists in the past as choices, by depressing a "jump to next choices" button 1306.

When the user selects one of content lists on the content list selection screen 1305, and depresses an "OK" button 1307, the CPU 33 accepts the content list selected by the user (step S1207), and terminates the present content list selection process to return to the firmware downgrade process in FIG. 8.

Figure 14B:
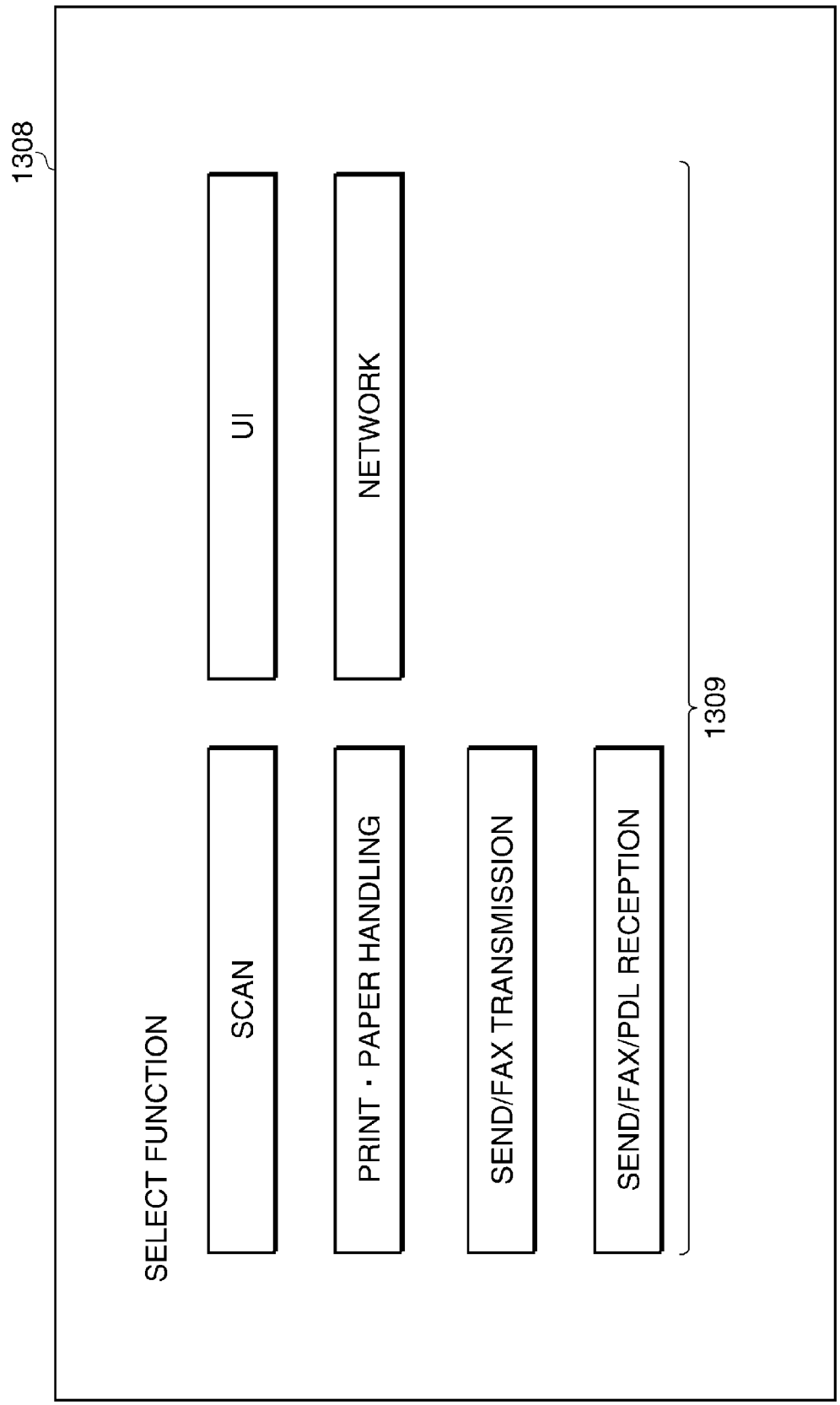

On the other hand, in the step S1203, if the user selects the "search from function" button 1302, the CPU 33 displays a function selection screen 1308 shown in FIG. 14B on the console section 205 (step S1208). On the function selection screen 1308, a button group 1309 corresponding to the affected range information in FIG. 10B is provided. The user selects and depresses a button having a function name presumed to be concerned with the current abnormality of the multifunction peripheral 102 from the button group 1309.

Next, in a step S1209, the CPU 33 accepts the function selected by the user. The CPU 33 retrieves, from content lists which can affect the function selected by the user, those which give operation records each indicating a stable actual operation of the multifunction peripheral 102, and displays them as choices on the same content list selection screen 1305 as shown in FIG. 14A on the console section 205 (step S1210). At this time, the console section 205 functions as the display unit. Criteria of determining whether or not a content list gives an operation record indicating a stable actual operation of the multifunction peripheral 102 is the same as described above. Note that although in the example shown in FIG. 14A, the content lists are displayed in the ascending order of the degree of recorded actual operation, i.e. from shortest to longest in operation time period and from smallest to largest in the number of jobs, the content list selection screen 1305 may be configured to be capable of sorting and displaying the content lists in the descending order of the degree of recorded actual operation, i.e. from longest to shortest in operation time period and from largest to smallest in the number of jobs.

Then, similarly to the above-mentioned case of "search from update time", the CPU 33 accepts the content list selected by the user (step S1207), and terminates the content list selection process to return to the firmware downgrade process in FIG. 8. Note that although the screens displayed as the results of retrieval by "search from update time" and "search from function" have been described using the same content list selection screen 1305 shown in FIG. 14A, the screens can be configured to be different ones.

On the other hand, in the step S1203, when the user selects the "search from job history" button 1303, the CPU 33 displays a job history record selection screen 1310 shown in FIG. 15A on the console section 205 (step S1211 in FIG. 12B). The user selects a job history record which the user desires to use as a search condition from the job history record selection screen 1310, and depresses a "next" button 1311.

Figure 15B:
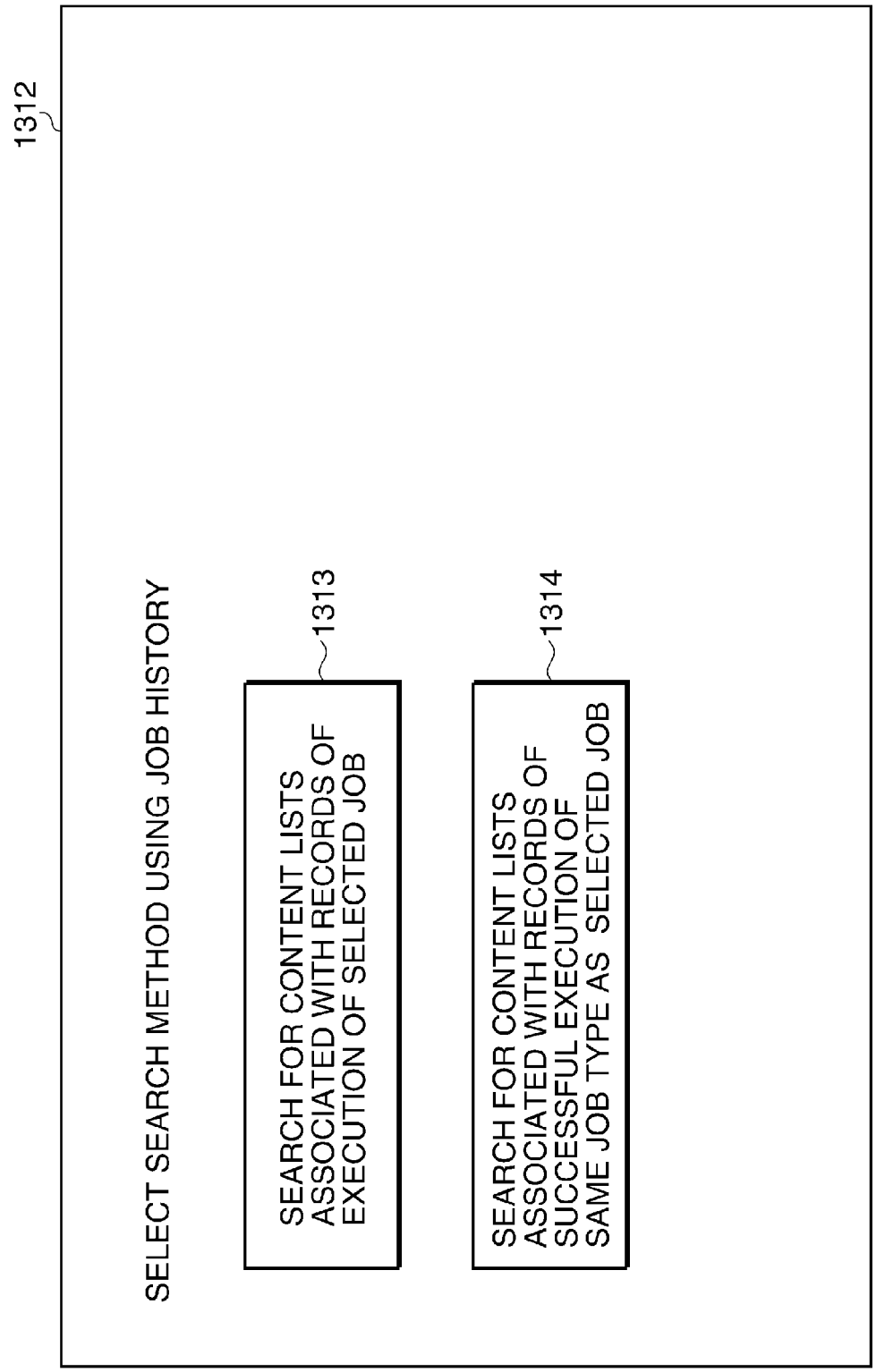

Upon acceptance of the job history record for use in the search from the user (step S1212 in FIG. 12B), the CPU 33 displays a job history search method selection screen 1312 shown in FIG. 15B on the console section 205 (step S1213). At this time, the console section 205 functions as the display unit.

The user selects and depresses one of a "search for content lists associated with records of execution of selected job" button 1313 and a "search for content lists associated with records of successful execution of same job type as selected job" button 1314. For example, if the user has a grasp of the successful job history records in the past, and positively desires to restore the firmware to one of the firmware configurations at times when the associated jobs were successful, the user depresses the button 1313 to search for such content lists. On the other hand, if the user has no grasp of the successful job history records in the past, but desires to restore the firmware to one of the firmware configurations associated with job history records of successful execution of the same job type as the job indicated by the selected job history record, the user depresses the button 1314 to search for such content lists. The CPU 33 determined which of the "search for content lists associated with records of execution of selected job" button 1313 and the "search for content lists associated with records of successful execution of same job type as selected job" button 1314 has been selected by the user.

If the user selects the button 1313, the CPU 33 retrieves the content lists associated with records of execution of the job selected by the job history record accepted in the step S1212, and displays them as choices on the same content list selection screen 1305 as shown in FIG. 14A (step S1215).

On the other hand, if the user selects the button 1314, the CPU 33 executes the following: The CPU 33 retrieves the content lists associated with job history records of successful execution of the same job type as the job indicated by the selected job history record accepted in the step S1212, and displays them as choices on the same content list selection screen 1305 as shown in FIG. 14A on the console section 205. Then, similarly to the above-mentioned case of "search from update time", the CPU 33 as the accepts a content list selected by the user (step S1207), and terminates the content list selection process to return to the firmware downgrade process in FIG. 8.

As described above, also when a content list is searched for from the job history, it is possible to use information on a third-party customized application as a job type. Therefore, when an abnormality due to the update is caused by such a customized application, by using the job history, it is easy to search for an appropriate content list associated with a version of firmware in the past to which the present firmware should be downgraded.

According to the present embodiment, when the user restores the present firmware to a past firmware version before the update, it is possible to select an appropriate content list in the past, based on the update history, the job history, the system operation history, the history of installation of the third-party application outside the control range. This enables the user to restore firmware programs to stable programs, which improves the convenience of the program update operation performed by the user.

Although in the above-described embodiment, the description has been given of the firmware installed in the multifunction peripheral 102, the apparatus is not limited to the multifunction peripheral, but may be any other information processing apparatuses, such as a printer, a scanner, or a facsimile machine. Further, an object to be updated in the apparatus is not only firmware, but also may be mere software.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 32 main controller
33 CPU
100 Internet
101 content server
102 multifunction peripheral
400 firmware
401 function module group
402 updater
501, 502 content list
503 differential package list

The invention claimed is:

1. An information processing apparatus comprising:
an update unit configured to update programs installed in the information processing apparatus;
an update information storage unit configured to store update information on the updated programs, when update of the programs is executed by said update unit;
an operation information storage unit configured to store operation information on programs other than the updated programs; and
a display unit configured to display the update information in association with the operation information, when an instruction for displaying update history of a program is input.

2. The information processing apparatus according to claim 1, wherein said operation information storage unit stores the number of times of execution of a job based on the other programs, as the operation information.

3. The information processing apparatus according to claim 1, wherein said operation information storage unit stores an installed state of the other programs, as the operation information.

4. The information processing apparatus according to claim 1, wherein said update unit downgrades the installed program to a program associated with the update information selected by the user.

5. The information processing apparatus according to claim 1, wherein said update information storage unit stores, as the update information, at least one of an operation time period of the program, the number of times of execution of a job based on the program, the number of occurrence of errors, and a total number of printed sheets.

6. The information processing apparatus according to claim 1, further comprising an installing unit configured to install a customized application, and wherein the operation information storage unit is configured to store operation information regarding the customized application installed in the information processing apparatus.

7. A method of controlling an information processing apparatus comprising:
updating programs installed in the information processing apparatus;
storing update information on the updated programs, when update of the programs is executed by said updating;
storing operation information on programs other than the updated programs; and
displaying the update information in association with the operation information, when an instruction for displaying update history of a program is input.

* * * * *